Feb. 7, 1950   S. B. WILLIAMS   2,497,040
HELICOPTER CONSTRUCTION
Filed April 19, 1947   4 Sheets-Sheet 2

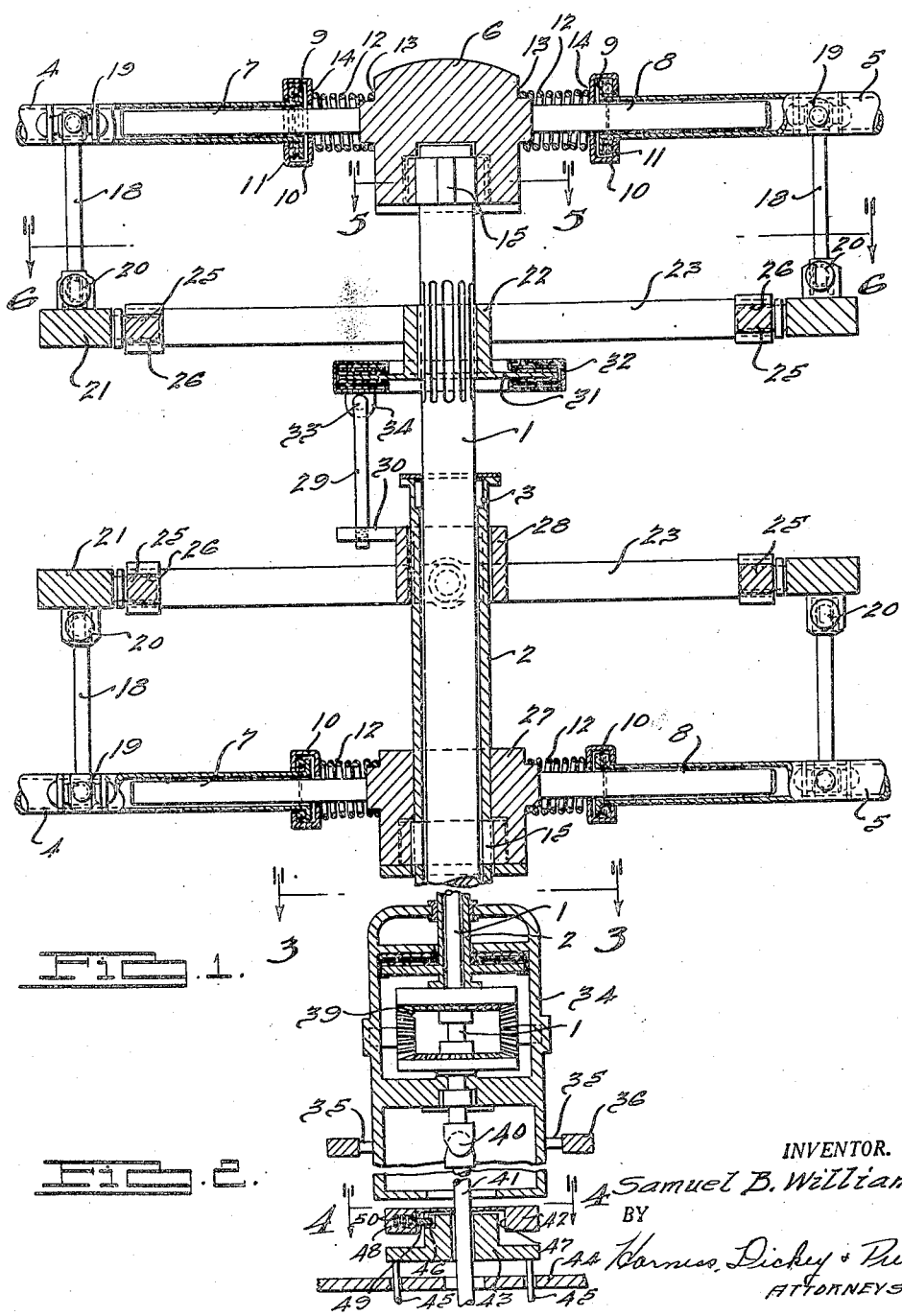

INVENTOR.
Samuel B. Williams
BY
Harness, Dickey & Pierce
ATTORNEYS.

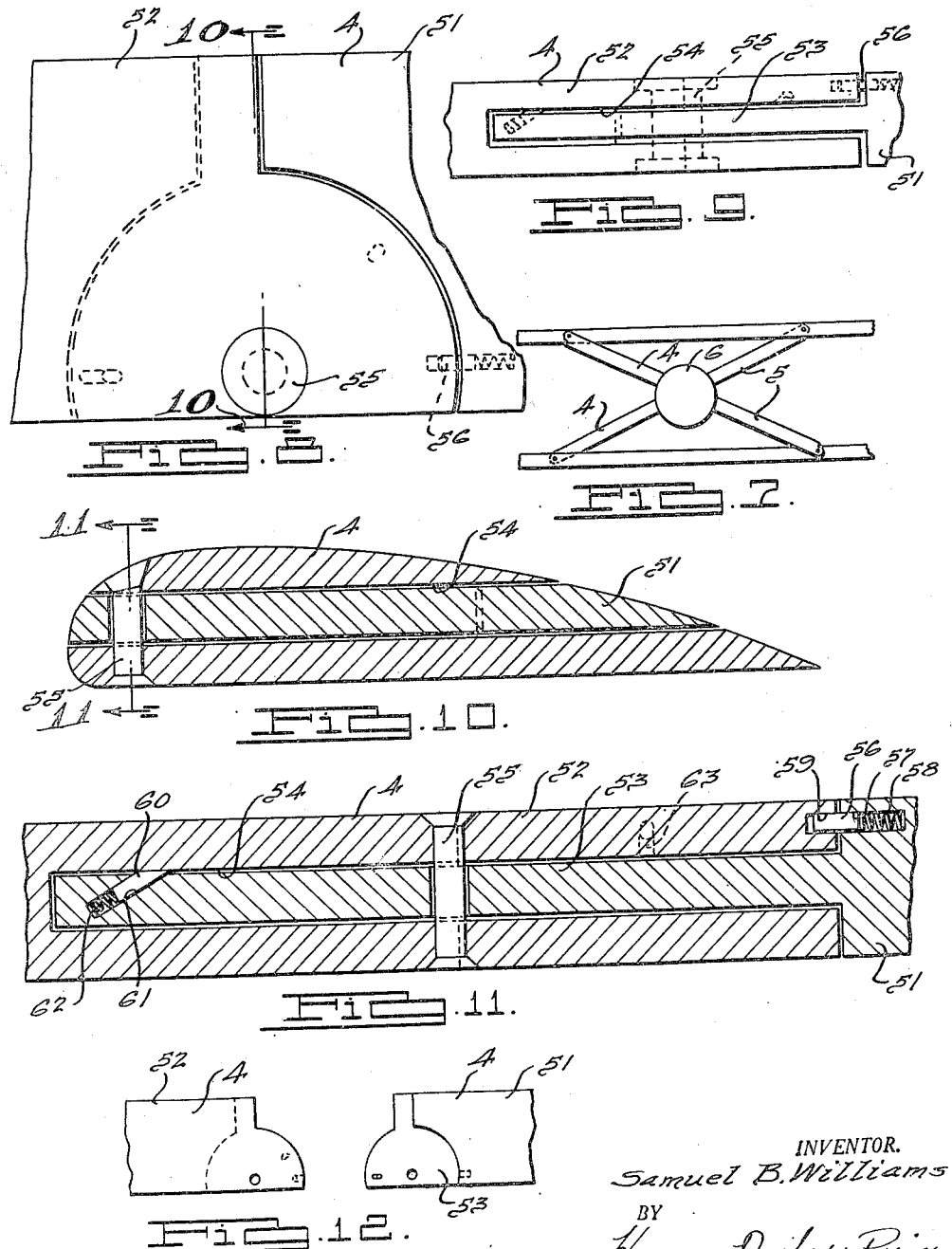

INVENTOR
SAMUEL B. WILLIAMS.

Patented Feb. 7, 1950

2,497,040

UNITED STATES PATENT OFFICE 2,497,040

HELICOPTER CONSTRUCTION

Samuel B. Williams, Birmingham, Mich.

Original application April 11, 1945, Serial No. 587,739. Divided and this application April 19, 1947, Serial No. 742,491

3 Claims. (Cl. 170—160.12)

The present invention is a division of the copending application of Samuel B. Williams, Serial No. 587,739, filed April 11, 1945, now abandoned, for improvements in helicopter construction, and relates to improvements in helicopter mechanisms and particularly relates to such improvements for use either on the conventional type of helicopter or on a combined road vehicle and helicopter.

One of the primary objects of the present invention is to provide improvements in the mountings for the main rotor blades on the drive shaft which requires no control cables or rods from the cockpit and which provides for increasing the angle of incidence with increased rotational speed of the rotor; also provides a means of equalizing the lift on opposite blades for forward flight or for stability; and also provides an immediate change to the desired angle of incidence for autorotation in case of engine failure or cutout.

A further object of the invention is to provide improvements in helicopter mechanisms for either the single drive shaft type or the coaxial counter-rotating shaft type which has improved and simplified control and greater safety.

A further object of the invention is to provide improvements in helicopter control mechanisms whereby the speed and direction of flight may be controlled by the pilot while the stability of the machine is automatically controlled either with or without the engine operating.

Another object of the invention is to provide improvements in the main rotor blade structures whereby the blades may be folded while the machine is being used as a road vehicle but may be readily extended for use as a helicopter.

A further object of the invention is to provide improvements in foldable main rotor blades whereby such blades are automatically folded when the drive shaft is stopped and are automatically extended when the drive shaft is rotated, the blades being locked in both of these positions.

Another object of the invention is to provide improvements in folding main rotor blades of such a nature as not to interfere with the aerodynamic contour of the airfoil.

Other objects of the invention will become apparent from the following specification, the drawings relating thereto, and from the claims hereinafter set forth.

In the drawings, in which like numerals are used to designate like parts in the several views throughout:

Figure 1 is a partial vertical cross-sectional view, with parts in elevation, of the drive shaft construction for the main rotors and illustrating the manner in which the main rotors are mounted thereon and automatically controlled;

Fig. 2 is a vertical cross-sectional view, on a reduced scale, of a continuation of the structure shown in Fig. 1 and illustrating the manner in which the coaxial shafts are connected to the main drive shaft;

Fig. 7 is a top plan view of the four rotor blades, showing such blades in their folded position;

Fig. 8 is a fragmentary top plan view of a rotor blade taken in the region in which it is folded about a vertical axis;

Fig. 9 is a front elevational view of the structure shown in Fig. 8;

Fig. 10 is a cross-sectional view, taken substantially along the line 10—10 of Fig. 8;

Fig. 11 is a cross-sectional view taken substantially along the line 11—11 of Fig. 10;

Fig. 12 is a view similar to Fig. 8, on a reduced scale, and showing the two rotor wing sections separated, for the purpose of illustration;

Figure 3:
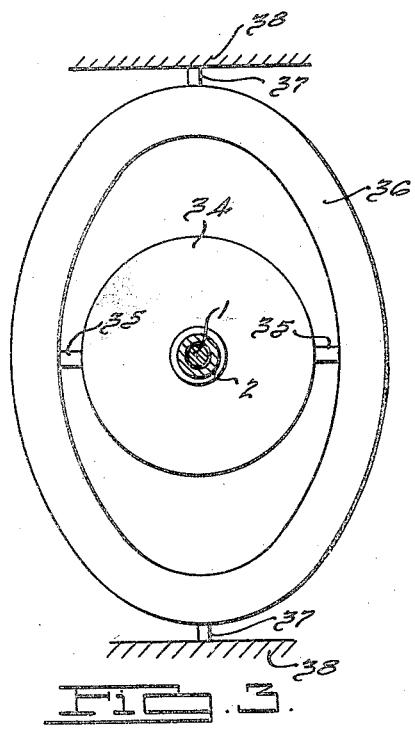
Fig. 3 is a top plan view of Fig. 2 and taken substantially along the line 3—3 thereof.
Figure 4:
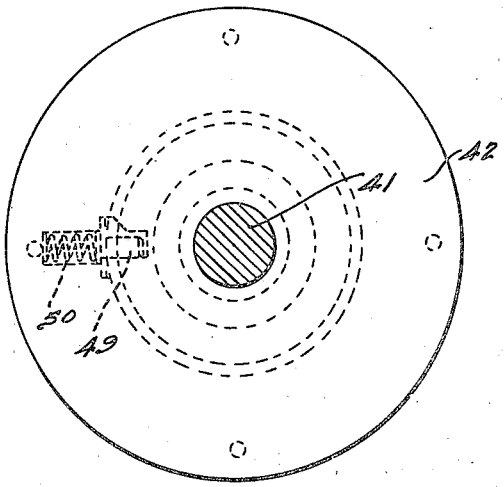
Fig. 4 is an enlarged cross-sectional view of the locking mechanism and taken substantially along the line 4—4 of Fig. 2.

The structure of the present invention may be employed either with a single drive shaft type of helicopter or with a coaxial counter-rotating type. Also, the controls of the present invention, according to the broader aspects thereof, are applicable to either a rigid rotor blade or a foldable blade.

Referring to the drawings, the manner in which the blades are mounted to the drive shafts is illustrated, together with the controls therefor. The particular embodiment illustrated is the coaxial counter-rotating type in which a pair of diametrically opposed blades is mounted to each of the drive shafts. It will be appreciated that the inventive concept is equally applicable to a single shaft and also to a construction employing more blades on each of the shafts.

In the embodiment illustrated, foldable blades are employed, but the controls of the present invention would be equally applicable to the unitary blades, as mentioned above.

In the drawings, a pair of coaxial drive shafts 1 and 2 is illustrated, the drive shaft 2 being tubular in form and embracing the drive shaft 1. It may be mounted upon and separated from the drive shaft 1 by means of axially spaced roller bearings 3 so that the shafts may freely rotate in opposite directions with respect to each other. A pair of diametrically opposed main rotor blades 4 and 5 is connected to the shaft 1 through a hub member 6. The hub member 6 has diametrically opposed mounting pins or rods 7 and 8 fixed thereto and projecting radially therefrom which are telescopically received within the inner tubular ends of the blades 4 and 5 respectively. The blades are mounted on the pins 7 and 8 so that they may move axially and rotate with respect thereto. The inner ends of the blades 4 and 5 are flanged outwardly as indicated at 9, and a housing 10 embraces the flange 9 and has ball bearings 11 interposed between the facing surfaces thereof. A coil spring 12 embraces the pin 7 and is welded to the hub member 6 as indicated at 13 and to the housing 10 as indicated at 14 so that the springs 12 act to resiliently pull the blades 4 and 5 radially inwardly toward the hub 6. As the blades are rotated about the axis of shaft 1, centrifugal force tends to urge the blades 4 and 5 radially outwardly against the action of springs 12 and the extent of such outward movement will depend upon the rotational speed of the blades.

Figure 5:
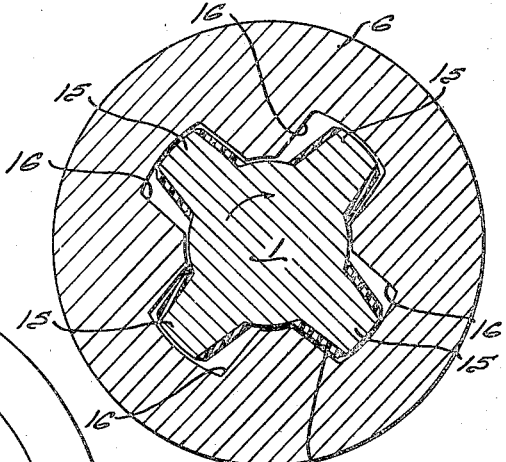
Fig. 5 is an enlarged cross-sectional view taken substantially along the line 5—5 of Fig. 1.
Figure 6:
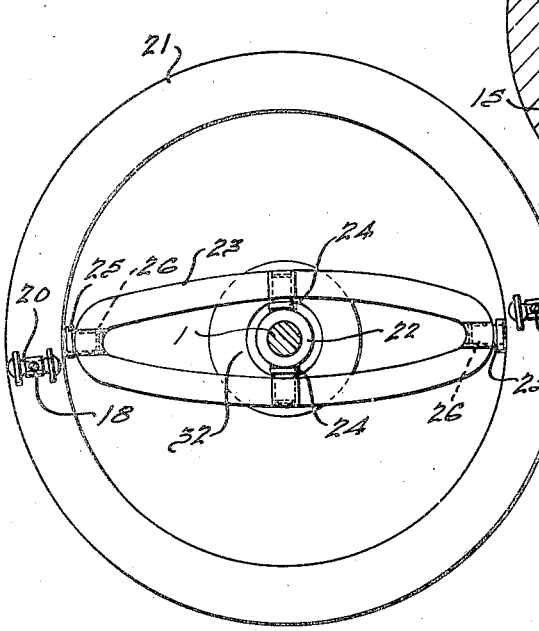
Fig. 6 is a cross-sectional view on a reduced scale, taken substantially along the line 6—6 of Fig. 1.
Figure 13:
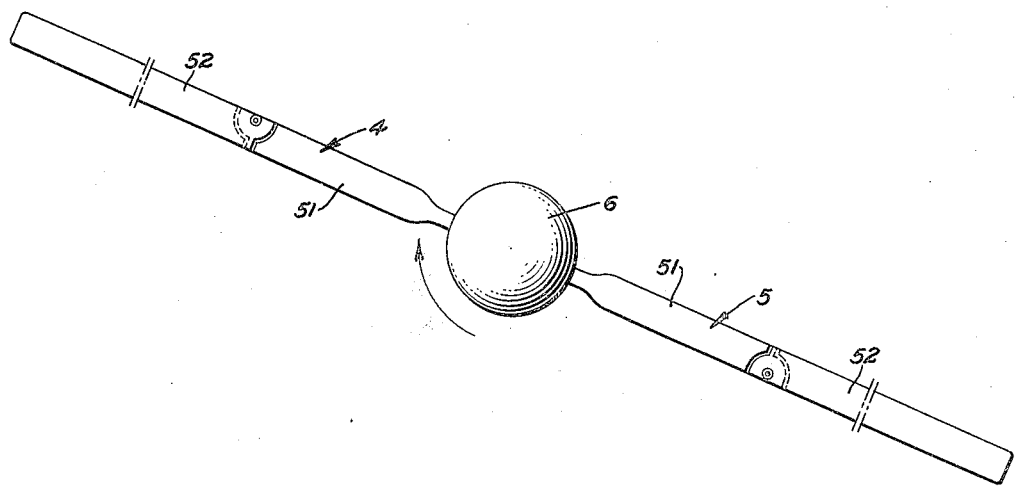
Fig. 13 is a top plan view of a pair of the diametrically opposed blades showing the blades in extended position.
Figure 14:
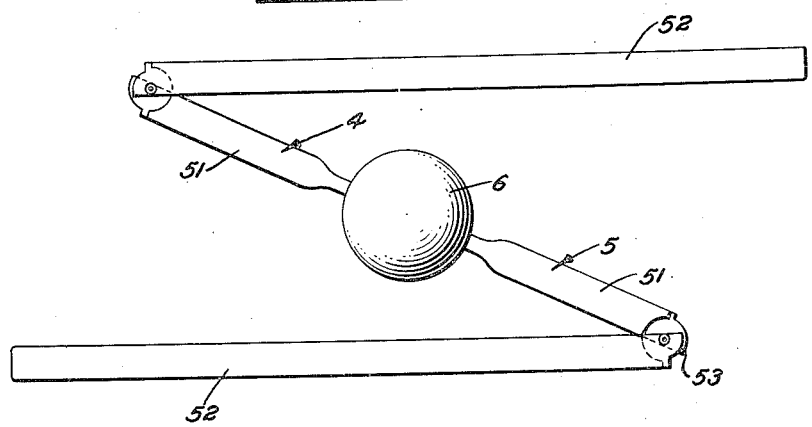
Fig. 14 is a view similar to Fig. 13 showing the blades in their folded position.

The driving connection between the shaft 1 and the hub 6 is best seen in Fig. 5, and may be termed a lost motion connection, so as to provide for a relatively different rotational position of the hub 6 with respect to the shaft 1 when the shaft 1 is driving the hub 6 or when the hub 6 is driving the shaft 1 during autorotation. Such connection includes a plurality of lateral projections 15 formed integral with the shaft 1 adjacent the upper end thereof which are received in recesses 16 formed in the hub 6. The surfaces of projections 15 may have a resilient material 17 fixed thereon providing bumpers so as to reduce shock, and it will be seen that the recesses 16 are wider than the projections 15, including the bumpers 17, so that the relative movement between hub 6 and shaft 1, above mentioned, may be accomplished.

Each of the blades 4 and 5 has a rod 18 connected to the trailing edge thereof by means of a universal joint 19. The connection to the blades is on the trailing edges of the upper rotors and on the leading edges of the lower rotors. The opposite end of each rod 18 is connected through a universal joint 20 with a wobble ring or wobble plate 21. The wobble ring 21 is connected to the shaft 1 through a hub member 22 and through an elliptical ring 23. The elliptical ring 23 is pivotally connected to the hub member 22 by means of a pair of diametrically opposed pivot pins 24 which are pivotally received within pivot openings in the ring 23. The elliptical ring 23 is pivotally connected to the wobble ring 21 by means of pivot pins 25, integral with the ring 21, which are received within the pivot openings 26 formed in the elliptical ring 23 at diametrically opposed points and spaced 90° from pivot pins 24. The wobble ring 21 is thus universally mounted with respect to the rotor drive shaft 1. The connection between the blades 4 and 5 and the shaft 1 is so constructed and arranged, as disclosed above, to permit rotative movement of the blades 4 and 5 about a longitudinal axis of the blades and the construction is preferably such that such longitudinal axis passes through a point near the leading edge of the airfoil section.

In the above description, only one pair of diametrically opposed blades and their connection to a single drive shaft has been described. In the functioning of the mechanism above described, it will be appreciated that, as the rotor shaft 1 is driven in the direction of the arrow of Fig. 5, the blades 4 and 5, together with the ring 21, are rotated. The hub 22 is splined to the shaft 1 so that it rotates therewith but may slide longitudinally with respect thereto. The shaft 1 is driven from a suitable prime mover to give the desired speed. Because of centrifugal force, the blades 4 and 5 tend to move away from the main shaft 1 with a force dependent upon the rotational speed. This force is resisted by springs 12. Thus, the rotational speed determines the distance to which blades 4 and 5 are moved away from shaft 1. Since ring 21 is fixed in a radial direction, any motion of blades 4 or 5 away from the shaft 1 causes such blades to rotate about pins 7 or 8 to give a definite angle of incidence to the blades for each speed. This is, of course, effected through the connection between blades 4 and 5 with ring 21 by the rods 18 and their associated universal joints. The ring 21 is, of course, free to wobble in any direction about a point at the center of shaft 1 due to its universal connection therewith. If the lift on blade 4 or 5 is suddenly increased, the angle of attack of this blade will tend to decrease, causing ring 21 to tilt. This action increases the angle of attack of the opposite blade, resulting in an increase in lift on that blade which, in turn, results in a balance of lift between the blades.

As mentioned above, the shaft 1 can be at one of two angles with respect to the hub 6. This position depends on whether the shaft 1 is driving the blades, or the blades are driving the shaft 1, as in autorotation. When the engine is cut out, the blades rotate, through the hub 6, with respect to the shaft 1 through a small angle. Since the wobble ring 21 is fixed against rotation with respect to shaft 1, this causes the angle of incidence of blades 4 and 5 to decrease to that desired for autorotation, when the blades are driving the shaft.

The above description has been directed primarily to the operation of a single drive shaft and the controls for the blades associated with that shaft. It has also been directed to a pair of rotor blades, but it will be appreciated by those skilled in the art that more than the two blades shown could be used within the teachings of the present invention.

The embodiment particularly illustrated shows the coaxial counter-rotating shafts 1 and 2. It will be understood that shaft 2 rotates in the opposite direction to that of shaft 1. A pair of blades is mounted on shaft 2 and a control for such blades similar to the control for the blades discussed above is provided. Similar numerals are used to designate corresponding parts in both the mountings for the blades and the controls therefor. It will be seen that the wobble plate and its connection to the blades for those mounted on shaft 2 are disposed above the blades, rather than below the blades as above discussed.

A hub member 27, corresponding to hub member 6, embraces shaft 2 and is connected thereto for limited rotation with respect thereto in the same manner that hub 6 is connected to shaft 1.

A hub member 28, corresponding to hub member 22, is splined to shaft 2 for rotation therewith but for limited longitudinal movement with respect thereto and is connected to the elliptical ring 23 for the lower rotor blades in the same manner that the corresponding ring is connected to hub member 22 for the upper rotors.

In order to automatically equalize the drag between the upper and lower rotors, to make certain that no torque reaction is applied to the helicopter regardless of flying conditions, the hub members 22 and 28 are connected together in order to maintain them at a fixed distance apart. Such connection includes a rod 29 which is fixed to a flange 30 formed on the hub member 28. The hub member 22 is formed with an annular flange 31, and an annular ball bearing housing 32, having ball bearings therein, embraces the opposite sides of the flange. The rod 29 is connected to the housing 32 by means of a pin 33 and a depending lug 34 so that the hubs 22 and 28 may rotate in opposite directions.

The action to automatically control the lower blades is exactly the same as that described above for the upper blades. The centers about which the upper and lower rings 21 wobble are always at a fixed distance apart, due to the pin connection therebetween. Lift on the blades of the upper rotors tends to reduce their pitch, thus raising the upper ring 21. Lift on the lower rotor blades tends to move the lower ring 21 down. If the lift on the upper rotor exceeds that on the lower rotor, the rings 21 will move up, reducing the pitch of the upper rotor blades and increasing the pitch of the lower rotor blades, thus insuring equal lift on the rotors at all times. Since, for practical purposes, the lift is proportional to the drag, the drag on each rotor will be the same and thus their torque reactions will always balance.

Referring to Fig. 2, the connection for shafts 1 and 2 to the engine or to the prime mover is illustrated so that for horizontal flight the rotor head will be tilted in the desired direction. This connection includes a housing 34 which is pivotally connected at diametrically opposed points by pivot pins 35 to an elliptical ring 36. The elliptical ring 36 is pivotally connected at diametrically opposed points by pivot pins 37 to a fixed part of the helicopter body indicated at 38. The pivots 37 are 90° displaced from pivots 35. A universal mounting is thus provided for the housing 34. Shafts 1 and 2 are mounted within housing 34 so that such shafts may tilt with the housing. A planetary gear set, indicated at 39, is mounted within the housing, and the shaft 1 extends through the gear set and is fixed to the lower gear. The shaft 2 is fixed to the upper gear of the planetary gear set. The shaft 1 is connected at its lower end through a universal joint 40 with the main drive shaft 41 of a suitable prime mover. Thus, as the shaft 41 is driven in one direction, the shaft 1 is driven in the same direction while the shaft 2 is driven in the opposite direction.

In order to automatically stop rotation of the shafts 1 and 2, when desired, a clutch is provided which is associated with shaft 41 to automatically stop its rotation. Such clutch includes a disk-like member 42 which is fixed to the shaft 41 for rotation therewith. Another disk member 43 embraces the shaft 41 and is mounted on a fixed part within the vehicle indicated at 44, so that the member 43 may be moved longitudinally of the shaft 41 but is held against rotation. Such mounting for the member 43 includes depending pins 45 which extend through openings in the member 44 and which may be suitably connected to an operating mechanism such as a lever located near the operator so that he may raise and lower member 43. Member 43 has an upwardly projecting portion having a slot 46 formed in the peripheral surface thereof which is adapted to be moved up within a recess 47 formed in the underside of member 42. Member 42 is formed with an inwardly directed radial recess 48 therein having a pin 49 projecting through the inner opening thereof and adapted to be received within the recess 46. The pin 49 is resiliently urged to its innermost position by means of a spring 50. This is, in effect, a centrifugal latch, and it will be appreciated that when member 42 rotates, the latch 49 is held in its outermost position by centrifugal force, but as the speed of member 42 drops, the member 49 will be moved to its innermost position by spring 50. When it is desired to stop rotation of shaft 41, and consequently stop rotation of shafts 1 and 2, the operator moves the member 43 to its uppermost position, and when the speed of shaft 41 drops to an extent that centrifugal force may be overcome by spring 50, the member 49 will enter recess 46 and stop rotation of the drive shafts. When it is desired to resume rotation, the operator can lower member 43 to its out-of-the-way position.

This stopping of locking mechanism is particularly significant in connection with the folding rotors of the present invention since it effects a sudden stopping of the drive shafts and causes an automatic folding of the rotor blades. This will be more apparent from the following description.

Referring to Figs. 7 through 12, the folding rotor blades are shown in detail. Each blade, such as blade 4, is formed of a pair of blade sections 51 and 52 which are pivotally connected by a vertical pivot preferably substantially one-third of the distance from the hub. Blade 51, which is the inner section, is formed with what may be termed a tongue 53 which is adapted to be received within a grooved portion 54 of blade section 52, which is the outer section. The shape and arrangement of such sections are best shown in Fig. 12. It will thus be seen that the tongue portion 53 is adapted to be received within the groove 54 and such sections are vertically connected together by means of a pivot pin 55 which passes through aligned openings therein. The shape of the complementary tongue and groove portions of the rotor sections 51 and 52 is such as to permit a folding forward of the outer rotor section 52 but to stop rearward movement thereof beyond the aligned position of the two sections.

Centrifugal latches are provided for holding the rotor blades either in closed or open position. The latching means for holding the blade sections in their extended position automatically releases when the drive shaft is stopped against rotation as described above. Such latching means includes a pin 56 which is mounted within a radial, cylindrical recess 57 in member 51. A coil spring 58 is disposed within the recess 57, one end thereof being fixed to the base of the recess and the opposite end thereof being fixed to the inner end of pin 56. Thus, the spring 58 serves to retract the pin 56 to its inner position, or toward the right viewing Fig. 11. The outer section 52 is formed with a cylindrical recess 59 which is adapted to be aligned with the recess 57 when the wing sections are in their extended, aligned position. It will be appreciated that, upon rotation of the rotors, the pin 56 is urged outwardly, by centrifugal force, against the action of spring 58 so that, when the wing sections are aligned, the pin 56 projects within recess 59 to latch the wing sections in the extended position while rotation continues. When the speed of rotation drops, the spring 58 acts to retract member 56 from recess 59 so that section 52 is free to swing forward about pivot 55 to its folded position. The sudden stopping of the drive shaft through the action of the latching mechanism 42 and 43 will thus cause the outer wing section to automatically fold to its closed position.

When the section reaches its folded position, it is latched in such position by means of another latching pin 60. Such latching pin 60 is disposed within a slanting recess 61 formed in the tongue 53 adjacent the outer end thereof. The recess 61 slopes downwardly and outwardly so that, when inner rotor section 51 rotates, the pin 60 is urged outwardly and down into the recess 61 to its retracted position. This action is against the action of a coil spring 62 which normally urges the pin 60 to its upper or extended position. When the rotor section 51 has been stopped, and the outer section 52 swung to its folded position, a slanting recess 63 formed in the upper inside face of the groove 54 overlies or is aligned with the recess 61. The pin 60 thus projects within the recess 63 to latch the rotor sections in folded position. When rotation of the rotor is resumed, the pin 61 is withdrawn from recess 63 against the action of spring 62, due to the centrifugal action, and the wing section will open to its extended position where it will then be latched by pin 56.

Formal changes may be made in the specific embodiment of the present invention without departing from the spirit and scope of the invention which is commensurate with the accompanying claims.

What is claimed is:

1. In a helicopter a main rotor blade comprising a pair of sections, means pivotally connecting said sections for pivotal movement with respect to each other about a vertical axis, means for holding said sections in either folded or extended positions, means for rotating said blade, and means for suddenly stopping said rotation of the extended blade to urge it to its folded position.

2. In a helicopter a main rotor blade comprising a pair of sections, means pivotally connecting said sections for pivotal movement with respect to each other about a vertical axis, means for holding said sections in either folded or extended positions, means for rotating said blade, and means responsive to centrifugal force for suddenly stopping the rotation of the extended blade to urge it to its folded position.

3. A helicopter main rotor blade comprising a pair of abutting sections adapted, when extended, to form a continuous unitary rotor blade, means pivotally connecting the adjacent and abutting ends of said sections together for pivotal movement of said sections with respect to each other about a vertical axis, and latching means responsive to centrifugal action for holding and releasing said sections in either folded or extended positions.

SAMUEL B. WILLIAMS.

REFERENCES CITED

The following references are of record in the file of this patent:

UNITED STATES PATENTS

| Number | Name | Date |
|---|---|---|
| 871,729 | McChord | Nov. 19, 1907 |
| 1,330,321 | Hill | Feb. 10, 1920 |
| 1,371,493 | Kugler | Mar. 15, 1921 |
| 1,388,642 | Haupt | Aug. 23, 1921 |
| 1,464,410 | Dawson | Aug. 7, 1923 |
| 1,485,704 | Pescara | Mar. 4, 1924 |
| 1,546,313 | Pescara | July 14, 1925 |
| 1,550,106 | Shaw | Aug. 18, 1925 |
| 1,793,651 | Thorsen | Feb. 24, 1931 |
| 1,923,842 | Pratt | Aug. 22, 1933 |
| 2,074,807 | Reed | Mar. 23, 1937 |
| 2,108,839 | Wilford, et al. | Feb. 22, 1938 |
| 2,295,503 | Miller | Sept. 8, 1942 |
| 2,312,624 | Caldwell | Mar. 2, 1943 |
| 2,464,285 | Andrews | Mar. 15, 1949 |

FOREIGN PATENTS

| Number | Country | Date |
|---|---|---|
| 285,012 | Germany | June 16, 1915 |